(No Model.) 7 Sheets—Sheet 4.
H. H. SESSIONS.
CAR BRAKE.
No. 515,555. Patented Feb. 27, 1894.
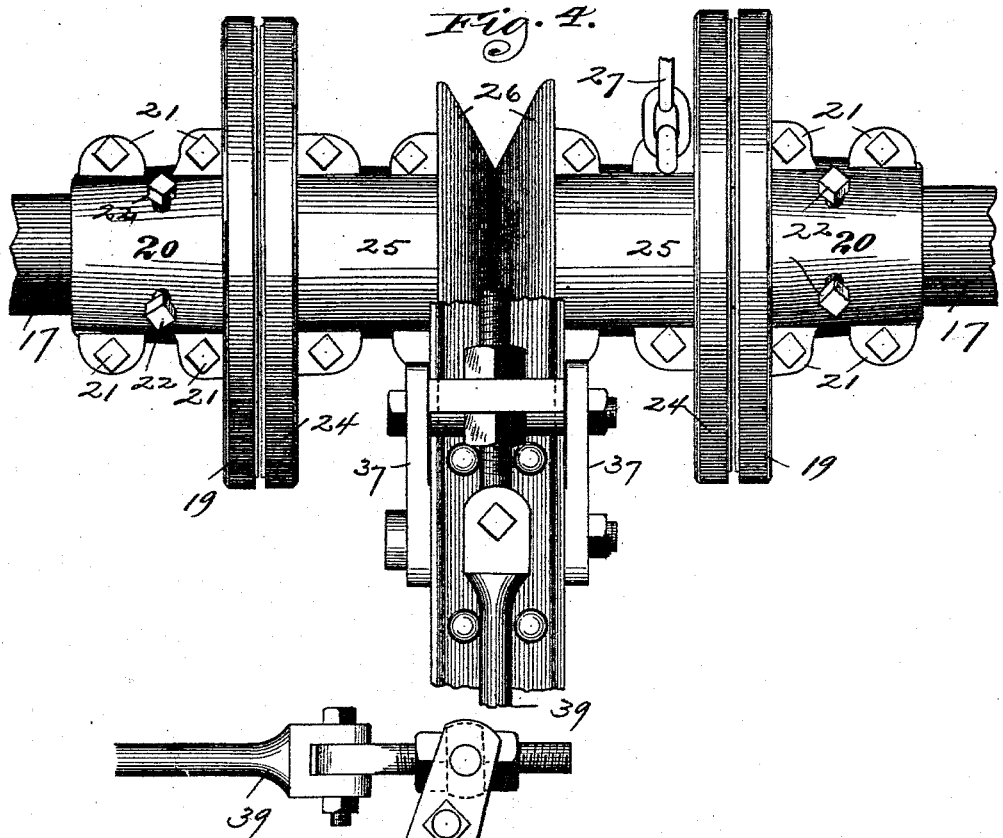
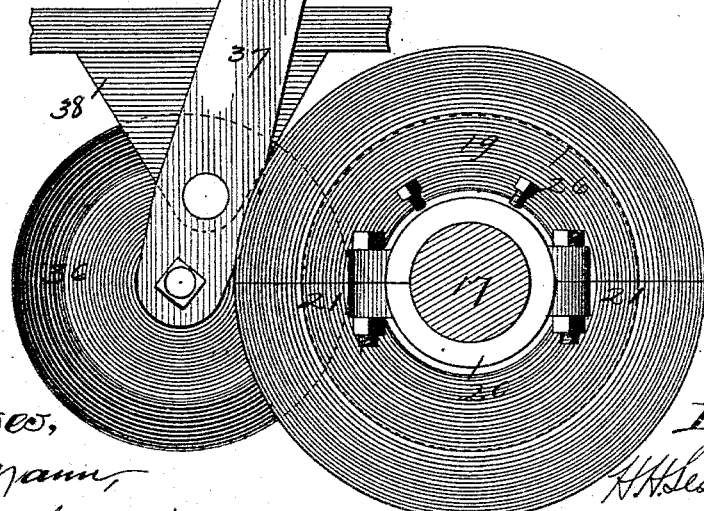
Witnesses, Inventor:

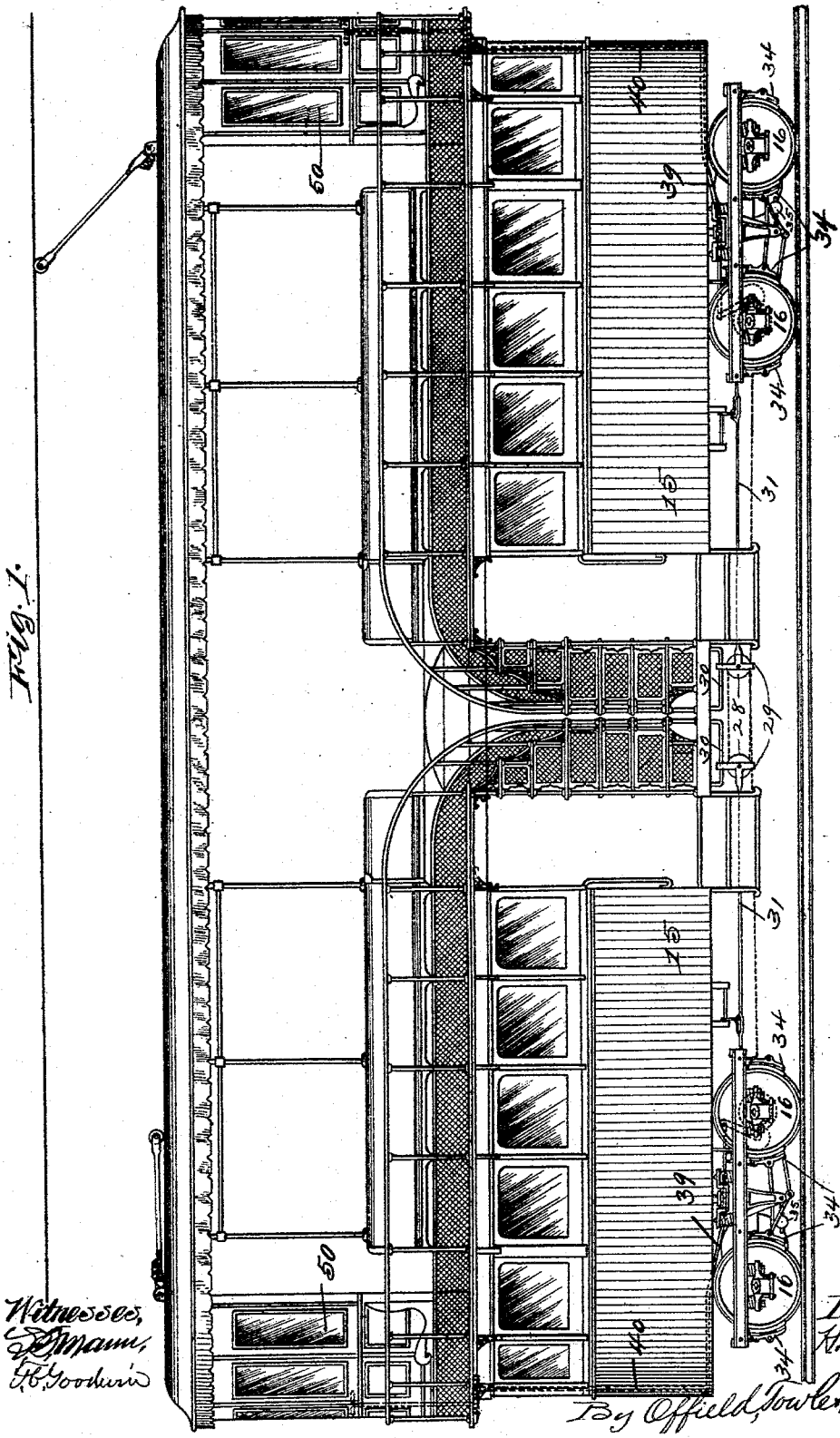

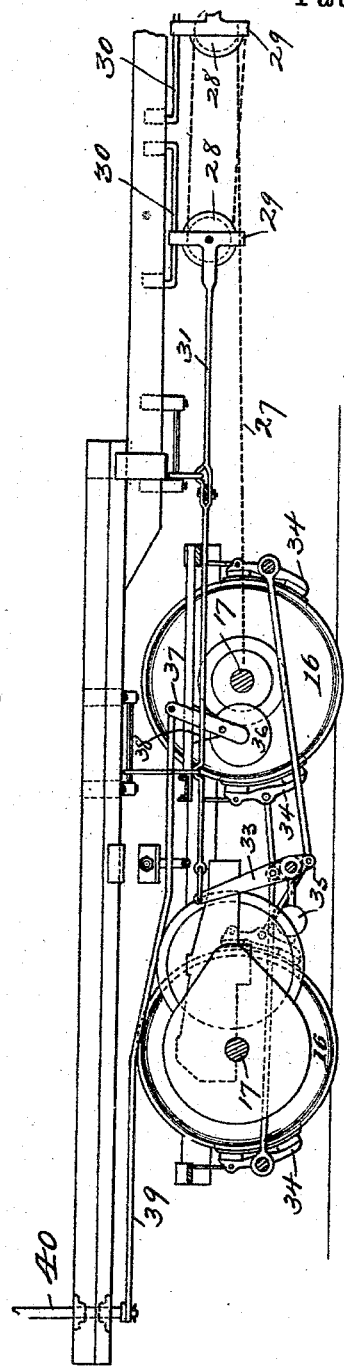

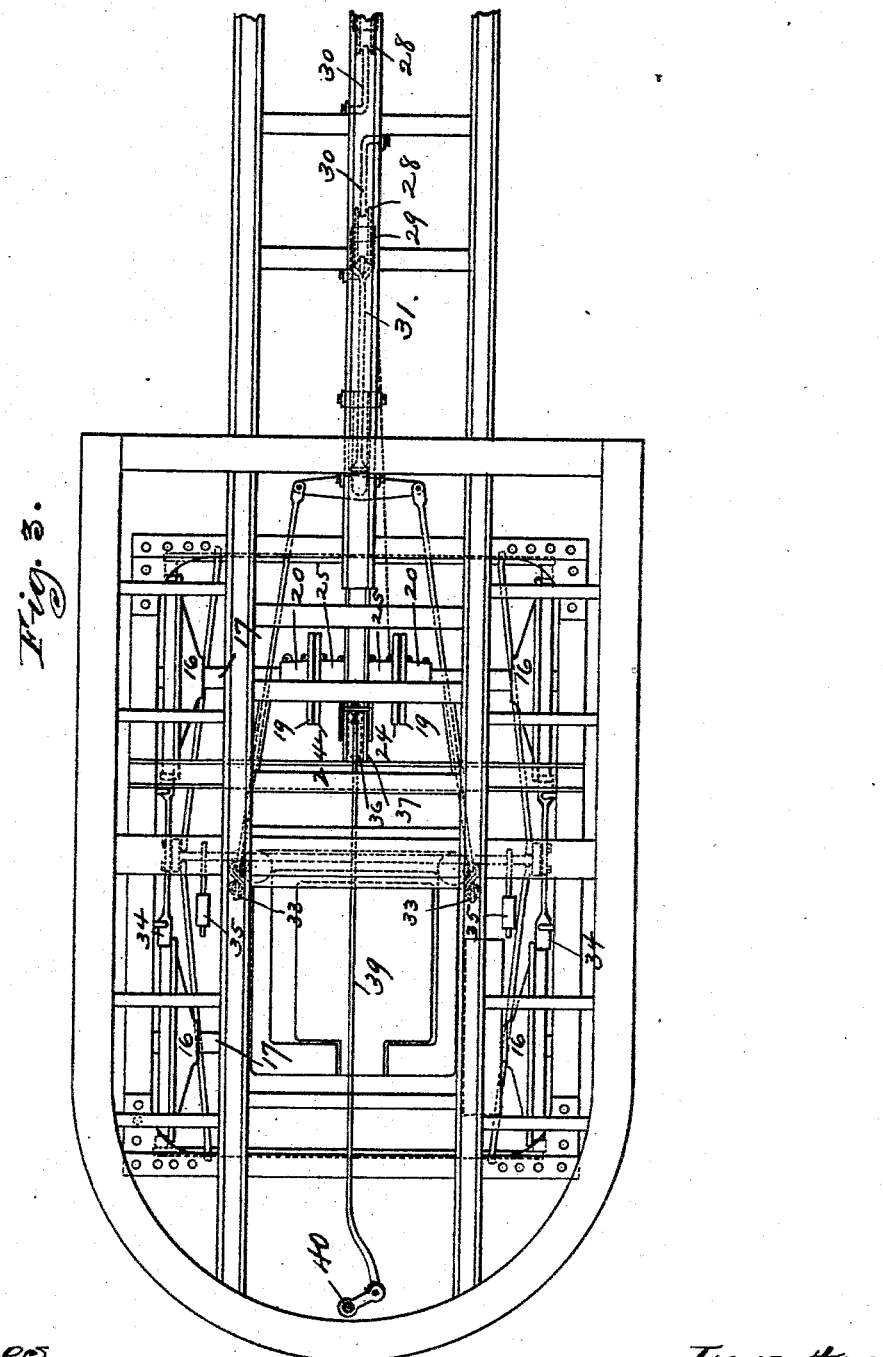

(No Model.) 7 Sheets—Sheet 5.
H. H. SESSIONS.
CAR BRAKE.
No. 515,555. Patented Feb. 27, 1894.
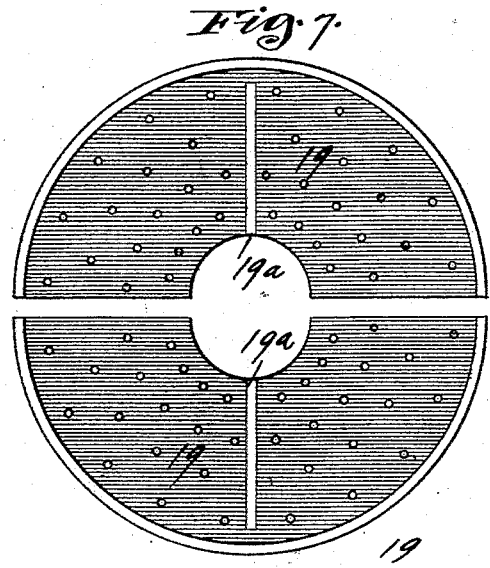
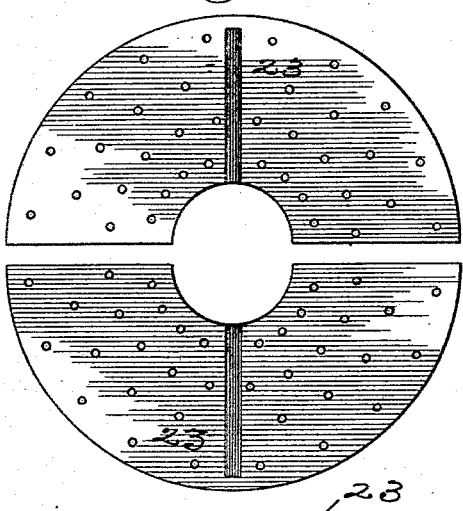
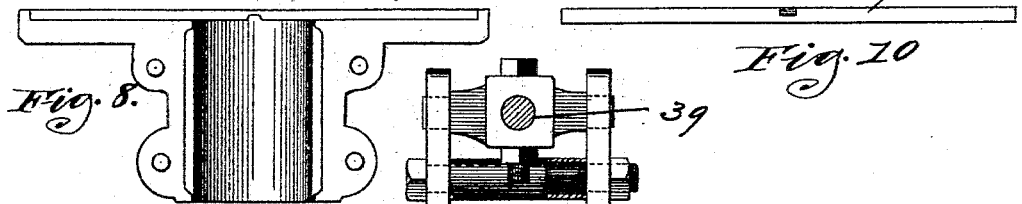
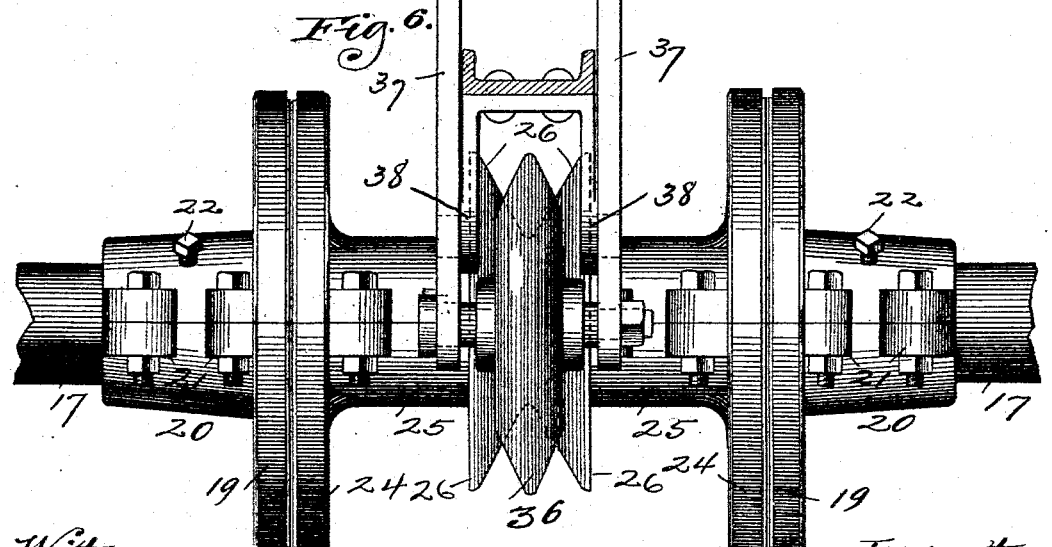
Witnesses,
Inventor,
H. H. Sessions

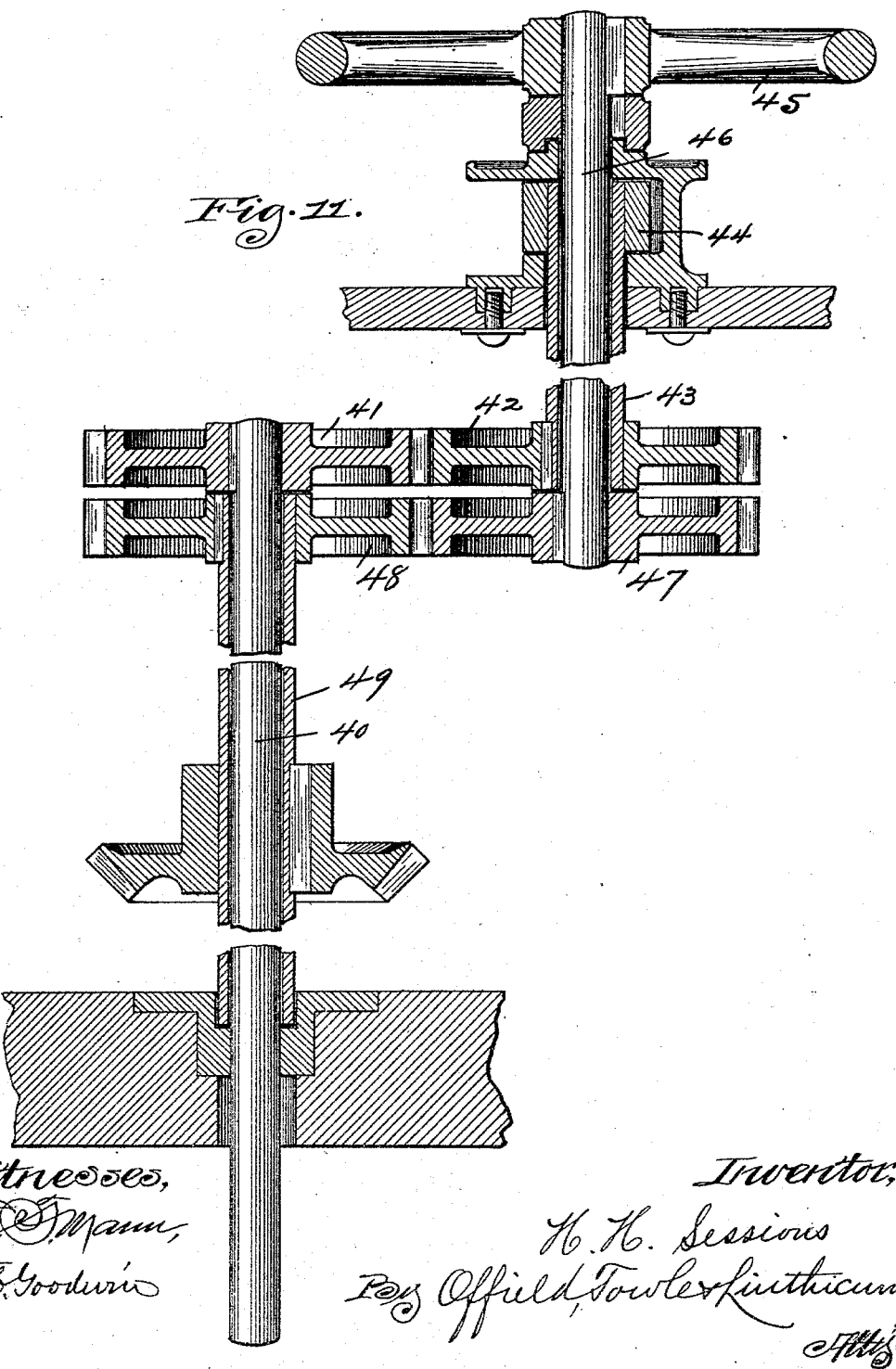

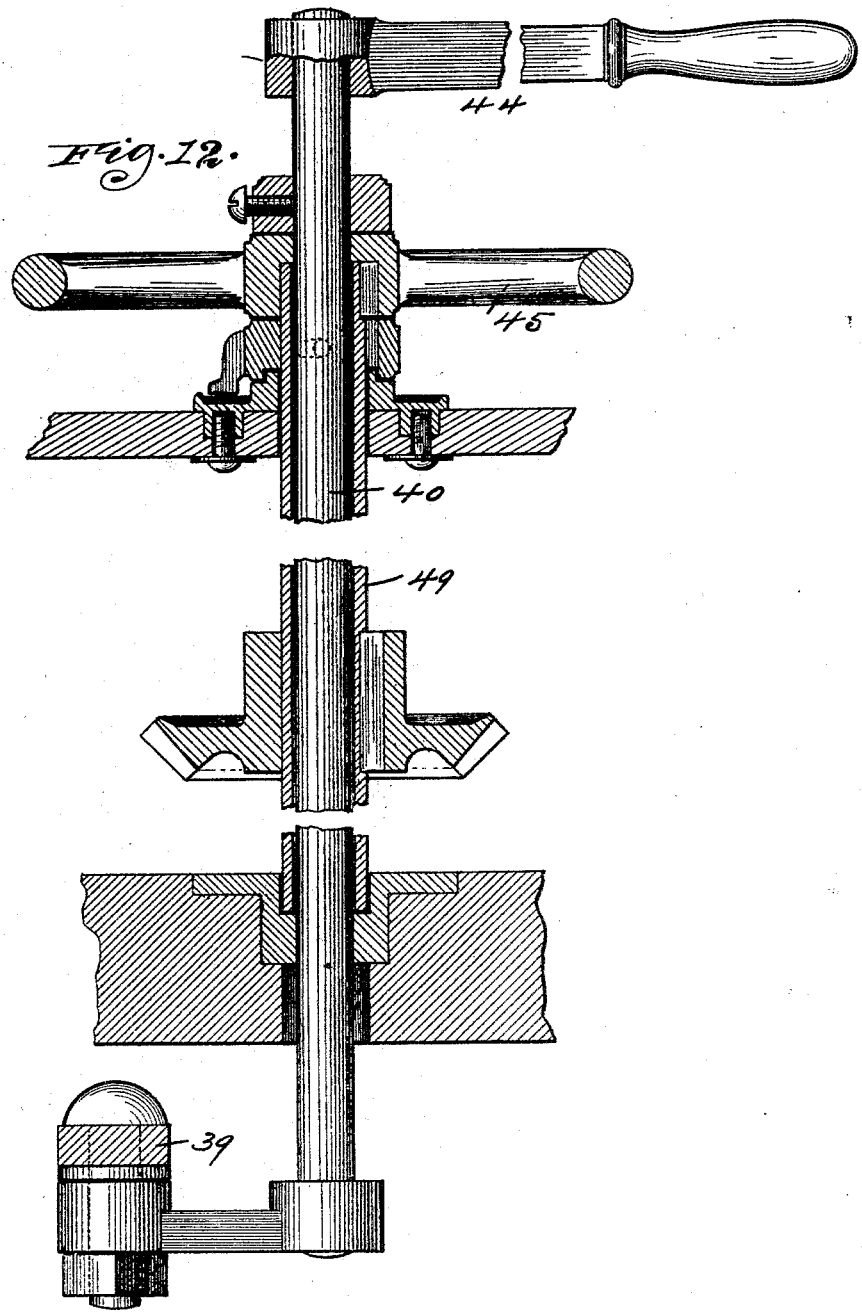

UNITED STATES PATENT OFFICE.

HENRY HOWARD SESSIONS, OF CHICAGO, ILLINOIS, ASSIGNOR TO THE PULLMAN'S PALACE CAR COMPANY, OF SAME PLACE.

CAR-BRAKE.

SPECIFICATION forming part of Letters Patent No. 515,555, dated February 27, 1894.

Application filed December 18, 1891. Serial No. 415,493. (No model.)

*To all whom it may concern:*

Be it known that I, HENRY HOWARD SESSIONS, of Chicago, Illinois, have invented certain new and useful Improvements in Car-Brakes, of which the following is a specification.

My invention relates to certain improvements in car brakes; and the object of my invention is to provide a powerful brake which can be applied without injurious shock or jar and from either end of the car, and so constructed that if one or more of the parts break, the uninjured parts will still be effective to stop the car or train.

My improvements relate more particularly to the brake gear, said gear being of that class generally designated "friction gear," and comprising in my improved construction two disks fixed upon the axle of the car truck and two disks loosely mounted and capable of sliding thereon, the sliding disks being moved by forcing between them a wedge-face disk, the latter being mounted so as to swing on a horizontal axis and which may be actuated either by hand or by power, but I have provided a special construction of operating mechanism for applying the brake from a cab on the car roof. I preferably provide the trucks at each end of the car with the friction gear and connect the gearing at opposite ends of the car by a chain, cable or other flexible connecting means which shall be adapted to be taken up and paid out by the setting or releasing of the brakes, said chain being connected with and adapted to move the brakes so as to force them against the wheels, their release being effected, preferably, by a weight normally tending to move them away from the wheels. Of course the several cars of the train may have their brakes connected so that the application of the brake upon one car shall set all of those upon the train.

In the accompanying drawings, Figure 1 is a view in side elevation of a street railway car of a recent type having a double deck and elevated cabs for the driver. Fig. 2 is a side elevation of one of the trucks and a part of the floor timbers and frame of the car, the brake connection and brake rod broken away. Fig. 3 is a plan view of the parts shown in Fig. 2. Fig. 4 is a plan view of an axle partly broken away and a friction gear mounted thereon, some of the supporting and connecting parts being also broken away. Fig. 5 is an end view of the parts shown in Fig. 4. Fig. 6 is a side elevation of the same. Fig. 7 is a face view of one of the friction disks, the friction plate being removed. Fig. 8 is an edge view of one-half of the same, these disks being separable so as to adapt them the better to be applied to the axle. Fig. 9 is a plan view of one of the friction plates usually composed of leather. Fig. 10 is an edge view of the same. Fig. 11 is a broken elevation, partly in section, of the brake rod of a hand brake, and also of a motor controlling shaft, the construction shown being particularly adapted to a car having the driver's cab elevated and projecting over the front of the deck; and Fig. 12 is a similar view of a modified construction of the same parts.

In the drawings, 15 represents the body of the car which may be of any kind or construction, but as shown in Fig. 1 is an electric street railway car having roof seats and drivers' cabs arranged at the extreme ends of the upper deck.

16 represents the truck wheels and 17 the axle. Upon one of the axles of each truck is mounted the friction gearing, comprising in my improved construction, a divided or separable disk 19, the rim being divided transversely and the hub longitudinally. The latter is marked 20 and is provided with bolt lugs 21, whereby its parts are secured together upon the axle.

In order to secure the friction member 19 from rotation, I employ the set screws 22, but other fastening means may be substituted therefor. The friction member 19 is a shallow cup shaped casting having ribs 19$^a$ by preference, and within the hollow is fitted the removable wearing disk 23, preferably of leather, and which is of such form as to fit accurately within the hollow of the member 19 to which it may be secured by rivets or in any other convenient way. Two of these friction members 19 are fixed upon the axle, preferably mid-way between its middle and the wheels, and there are also provided two movable friction disks each marked 24 and of similar construction to the fixed members except that their hubs 25 are not secured with the axle but are adapted to slide thereon. Said hubs have the enlargements 26 facing each other and preferably in or nearly in contact. To one of these hubs 25 is secured a chain or other flexible connecting medium 27 which, as shown in Fig. 2, is turned about pulleys 28, its opposite end being made fast to a similar hub of a similar friction gear mounted upon the truck at the opposite end of the car. These pulleys 28 are journaled in hoop hangers 29 which freely slide on the staples 30 secured with the frame work of the car, said hangers being each connected with brake rods 31 connected respectively to the brake levers 33, said levers being connected with and adapted to apply the brakes 34.

In order to insure the freeing of the brake shoes from the wheels, I may employ the weights 35 hung upon arms connected with the pivot of the brake lever.

The means for forcing the disks 24 into frictional engagement comprise the beveled edged disks 36, rotatably mounted in a frame 37, the latter being pivotally supported upon a bracket 38 depending from the floor frame. The upper end of this swinging frame has connected thereto a rod 39 having a crank connection with the brake rod 40. Said brake rod may be arranged as seen in Fig. 11, in which instance it has upon its upper end a gear 41 enmeshing with a gear 42 secured on the sleeve 43 and controlled by the brake lever 44.

45 represents a hand wheel secured with a rod 46 carrying a gear 47 enmeshing with a gear 48, the latter being secured with a sleeve 49 which controls the operation of the electric motor. The purpose of thus dividing the brake rod and gearing the sections thereof together will be understood by referring to Fig. 1 of the drawings, wherein 50 represents cabs for the driver located on the upper deck and at the extreme ends of the car. In order to have the brake and power levers conveniently arranged within the cab, they are divided and the upper portions thereof will extend into the cab and are therefore offset so that they may be placed near the front walls of the cabs respectively.

In Fig. 12 a modified arrangement is shown, the brake rod in this case being extended straight up from the crank and provided with an operating handle at its top while the power is controlled by the sleeve.

While I have described a specific means for operating the brake and one which is novel in the construction shown in Fig. 11, I do not limit that part of my invention relating to the construction and arrangement of the brake itself to this specific means for controlling the brake.

My invention may of course be applied to steam railway cars and the brakes may be operated by air, steam or other power; the brakes may be inside or outside brakes, or both inside and outside brakes may be employed as shown in the drawings.

While I prefer to provide each of the trucks of a car with the brake gear above described and connect them by a flexible connecting medium as described, I do not limit my invention thereto as, if desired, only one of the trucks of the car need be equipped with the friction appliances, the flexible medium in this case being suitably connected to the brake lever of the truck carrying the friction devices.

The brake above described is very powerful and utilizes in a practical manner the momentum of the train for the application of the brakes. A further desirable feature of the construction is that in case of injury to one or any number of the disks less than the whole, the uninjured parts will still be sufficient to apply the series of brakes to the wheels of the car.

The application of the brake can be made without shock or strain, the slack of the flexible chain or cable which is wound upon the hub of the friction disk being sufficient to provide for the gradual application of the brakes and the avoidance of injurious shock or jar.

I do not limit my invention to the precise details of construction, arrangement or connection of its parts.

It will be observed that as shown in the drawings only one of the hubs is connected to the brake levers. Of course both of the hubs may be connected by chains or cables as 27 to the same brake lever. But I prefer to connect to only one hub as shown and to utilize the other hub for the connection of an equalizer whereby the brakes on a car or cars coupled to the one carrying said friction devices may be operated.

I claim—

1. In means for operating car brakes, the combination with the car axle, of a friction gear secured thereon, a second friction gear slidably mounted thereon and a bevel faced gear rotatably mounted on a movable support and adapted to be thrust into engagement with the sliding gear whereby the latter may be thrust into frictional contact with the fixed gear, substantially as described.

2. In means for operating car brakes, the combination with a car axle of a friction gear mounted thereon and comprising in combination two members secured upon the axle, two members adapted to slide upon the axle and a movable and rotatable member adapted to be thrust between said sliding members whereby to move them into engagement with the stationary members and a flexible connection secured with one of the sliding members and connected with the actuating lever of the brake, substantially as described.

3. In means for operating car brakes, the combination with the brake shoes and their actuating lever, of friction gearing mounted upon the car axles at opposite ends of the car and adapted to be locked therewith, a flexible connection between the free members of the respective friction gears, intermediate movable pulleys around which said flexible connection is carried, said pulleys having sliding supports and brake rods secured with the supports of said pulleys and adapted to actuate the brakes, substantially as described.

4. In means for operating car brakes, the combination with the brake shoes and their actuating lever, of friction gearing mounted upon the car axles and adapted to be locked therewith, a flexible connection between the friction gearing and the brake actuating lever, a link or rod for actuating the friction gearing, and a brake rod operatively connected to said link and said brake rod being divided at the car roof and having its members geared together, substantially as described.

HENRY HOWARD SESSIONS.

Witnesses:
   E. C. TOURTELOT,
   E. R. CURTISS.